United States Patent
Bruck et al.

(10) Patent No.: US 6,511,076 B1
(45) Date of Patent: Jan. 28, 2003

(54) FIBER GASKET AND METHOD OF MAKING SAME

(75) Inventors: Gerald Joseph Bruck, Murrysville, PA (US); Mary Anne Alvin, Pittsburgh, PA (US); Eugene E. Smeltzer, Export, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 7 days.

(21) Appl. No.: 09/667,410

(22) Filed: Sep. 21, 2000

(51) Int. Cl.$^7$ .............. F16L 17/06; F16J 15/08
(52) U.S. Cl. ............. 277/610; 277/626; 277/627; 277/633; 277/650
(58) Field of Search ............... 277/610, 626, 277/627, 633, 644, 650, 652

(56) References Cited

U.S. PATENT DOCUMENTS

| | | | |
|---|---|---|---|
| 972,680 A | 10/1910 | Cole | |
| 4,187,136 A | 2/1980 | Nostrand | |
| 4,298,207 A | * 11/1981 | Hopper et al. | ............... 277/633 |
| 4,371,180 A | * 2/1983 | Case et al. | ................... 277/652 |
| 4,524,982 A | 6/1985 | Hertz, Jr. | |
| 4,581,882 A | * 4/1986 | Pallo et al. | ................. 277/650 |
| 4,980,006 A | 12/1990 | Bordner | |
| 5,082,293 A | 1/1992 | Steinetz | |
| 5,082,297 A | * 1/1992 | Flasher | ........................ 277/652 |
| 5,124,111 A | 6/1992 | Keller et al. | |
| 5,581,048 A | * 12/1996 | Shores | ........................ 277/652 |
| 5,651,554 A | 7/1997 | Townsend | |
| 5,964,468 A | 10/1999 | Chester | |
| 6,039,325 A | * 3/2000 | Steinetz et al. | ............. 277/633 |

FOREIGN PATENT DOCUMENTS

| | | |
|---|---|---|
| DE | 22 685 | 6/1883 |
| DE | 44 33 939 | 5/1995 |

* cited by examiner

*Primary Examiner*—Anthony Knight
*Assistant Examiner*—E Peavey

(57) ABSTRACT

A gasket (1) is made by repetitively spirally winding a fiber (3) back on itself in a closed path. The gasket (1) so made has a multi-layer spiral winding (1) formed in a loop (5). The fiber (3) can be wound at a constant wrap rate to form a gasket with a uniform cross-section around the loop. Alternatively, the wrap rate can be varied, increased to increase cross-sectional bulk, and decreased to reduce cross-section bulk around the loop (5). Also, the spiral winding (7) can be applied over a core (13) of either strands of the fiber (3) or a dissimilar material providing a desired property such as resiliency, stiffness or others. For high temperature applications, a ceramic fiber (3) can be used. The gasket (1) can have any of various geometric configurations with or without a core (13).

8 Claims, 2 Drawing Sheets

FIBER GASKET AND METHOD OF MAKING SAME

REFERENCE TO GOVERNMENT CONTRACTS

Development for this invention was supported in part by U.S. Department of Energy Contract No. DE-AC26-97FT33007. Accordingly, the United States Government may have certain rights in this invention.

BACKGROUND OF THE INVENTION

1. Field of the Invention

This invention relates to gaskets made of fibers and methods of making the same. In particular, it relates to such gaskets for high temperature applications and which are made by spirally winding a fiber back on itself in a closed path to form a loop, with or without a core.

2. Background Information

Gaskets used for high temperature applications are commonly made of high temperature sleeving material. The limited selection of sizes of sleeving material available makes it difficult to accurately size the loop or toroidal-shaped gaskets needed for such application. An example of such a gasket is the gasket required to seal a ceramic filter safe guard device of precise geometry inside a metal container.

Large and sometimes irregularly shaped or custom contoured gaskets have required configuration of fabric into an elongated bundle (roll) which is joined at the ends by overlapping and stitching. A bulge, lump, hard spot, weak spot or other discontinuity is inevitably produced at the connection. This discontinuity may present a potential leak path and/or point of failure. An alternate technique of layering fabric and cutting it with loop shaped dies, and then stitching the fabric layers together, eliminates the overlap but presents the problem of frayed edges that are very susceptible to unraveling and deterioration at the gasket edges. An example of this type gasket is the rectangular shaped gasket needed to seal cross flow or sheet filters to their adjoining hardware. Back pulse cleaning of the filters further aggravates the problem of fraying with such a structure.

There is a need, therefore, for an improved gasket, especially for high temperature applications, but for other applications also, which can be easily fabricated to any desired shape, whether regular or irregular, with or without a core. In particular, there is a need for such an improved fiber gasket that does not have any weak spots, lumps, bulges, hard spots or other discontinuities.

SUMMARY OF THE INVENTION

These needs and others are satisfied by the invention which is directed to a loop gasket having a multi-layer spiral winding of a fiber back around itself in a closed path forming a loop. The multi-layer spiral winding can have a constant pitch so that the cross-section of the loop is substantially constant around the closed path. Alternatively, the multi-layer spiral winding of the fiber can have a variable pitch around the closed path so that the loop has a variable cross-section. Also alternatively, the gasket can have a core forming a loop on which the multi-layer spiral winding of fiber is formed. This core which may have various geometric configurations, can be made of strands of the fiber or a different material such as a stiff or rigid material or a resilient material. For high temperature applications, the fiber can be a ceramic fiber.

The invention also embraces the method of making a loop gasket comprising spirally winding a fiber back around itself along a closed path repetitively to form a loop. The fiber can be repetitively wound at a constant wrap rate around the loop to provide a uniform build up of gasket cross-section, or can be repetitively wound at a variable wrap rate around the loop to produce a variable gasket cross-section. The step of winding comprises forming the loop in a selected geometric form. Also, the fiber can be spirally wound on a core forming the loop. Again, for high temperature applications, the fiber can be a ceramic fiber. The loop can be of any geometric cross-section.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
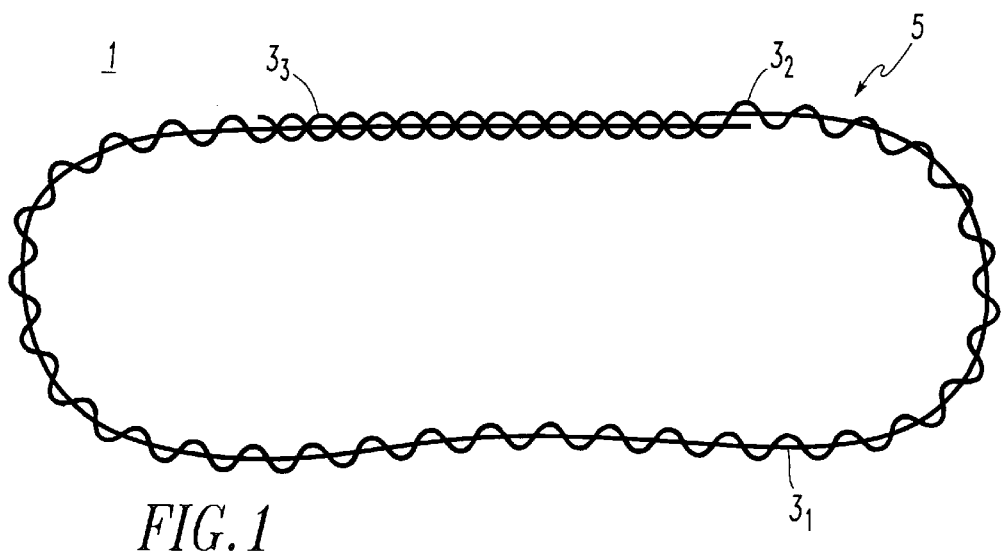
FIG. 1 is a schematic view showing the formation of a gasket in accordance with the invention.
Figure 2:
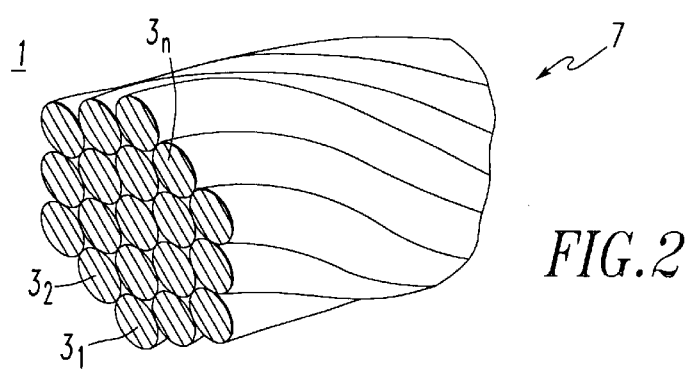
FIG. 2 is a cross-section through a gasket in accordance with the invention.
Figure 3:
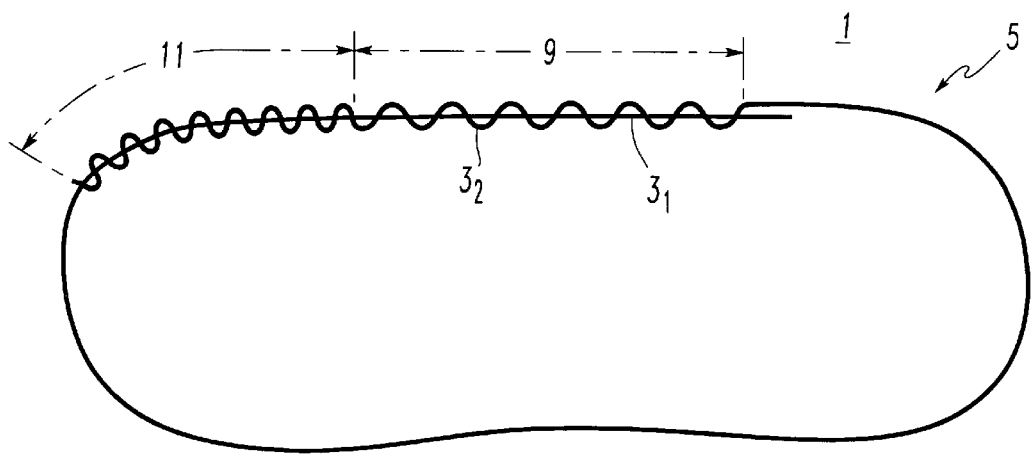
FIG. 3 is a schematic view illustrating the formation of a gasket having a variable cross-section.

FIG. 1 illustrates the formation of a fiber gasket 1 by spirally winding a fiber 3 repetitively back on itself in a closed path forming a loop 5. As can be seen, the first loop $3_1$ establishes the general gasket loop configuration. The second loop $3_2$ is wound over the first, and the third winding $3_3$ continues to build bulk. Additional windings up to $3_n$ are added to produce a multi-layer spiral winding 7 of the desired bulk. A cross-section through an exemplary multi-layer spiral winding 7 is shown in FIG. 2. The loop 5 can be of any geometrical configuration, such as for example, a circle, a rectangle, a polygon or any custom shape.

Where required, the cross-section through the multi-layer spiral winding 7 can be varied around the loop. To accomplish this, the pitch or wrap rate is varied. As shown in FIG. 3, a large pitch or slow wrap rate produces a small cross-sectional bulk in the section 9 while a small pitch or fast wrap rate produces a large cross-sectional bulk in the section 11.

Figure 4:
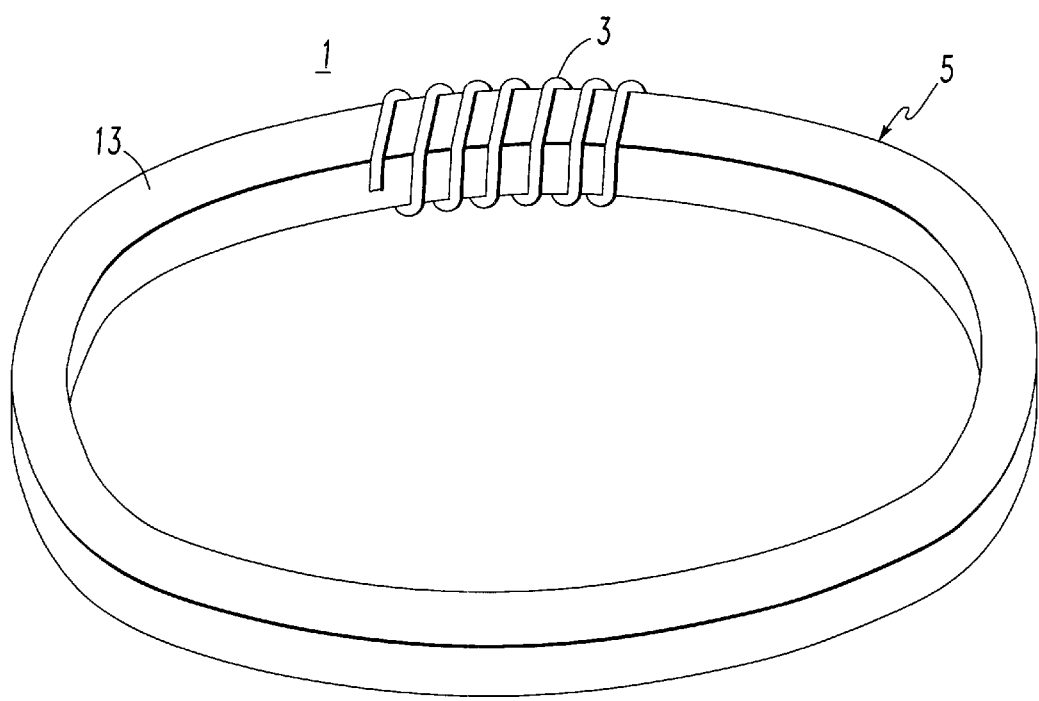
FIG. 4 is a schematic view of another embodiment of a gasket in accordance with the invention having a core on which the fiber is wound.
Figure 5:
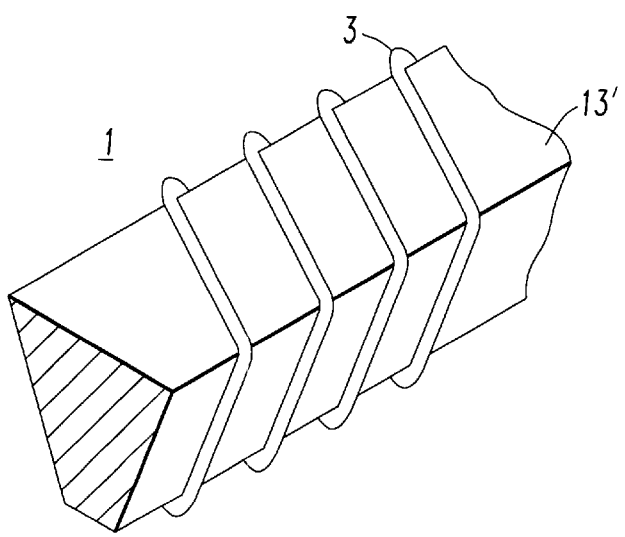
FIG. 5 is a cross-sectional view through a portion of a gasket having a core with a trapezoidal cross-section.

For some applications, the multi-layer spiral winding can be formed on a core 13 which establishes the geometric configuration of the loop 5 as shown in FIG. 4. Again, this loop established by the core can be of any geometric shape. The multi-layer spiral winding is then formed on this core, again multiple layers can be built up either at a constant or variable wrap rate to produce a fiber gasket with a desired cross-sectional bulk which may be constant or variable around the core. Indeed, the core itself can vary in cross-section around the loop. In addition, the core 13 can have various cross-sections whether constant or varying in dimension. For instance, the core can be circular in cross-section, rectangular, polygonal, oval or any other shape. For instance, FIG. 5 shows a core which is trapezoidal in cross-section. The core may have various selected properties, such as resiliency, stiffness or flexibility. Even with a substantially rigid core, the multi-strand fiber provides resiliency and compression for establishing a seal.

For high temperature applications, the fiber 3 can be a ceramic fiber. Various high temperature aluminosilicates are suitable candidates. Examples of such materials include NEXTEL™ and fibers marketed under the designations 312, 550, 610 and 720 all of which are made by Minnesota Mining and Manufacturing Company. Another suitable fiber is ALTEX® provided by Sumatomo Chemical. There are many advantageous to these fiber gaskets and the method of making them. First, simple string, thread, fiber or yarn may be utilized to build up a gasket of limitless geometry, including configuration of its loop in cross-sectional area. Specially dimensioned sleeve material is not required. Concerns about an overlap, potential leak at a discontinuity and fraying of gasket edges are avoided. Second, the wrap rate can be adjusted within the limits of fiber ductility to vary gasket geometry. Third, alternate geometry can be built up by varying the distribution and shape of core material. Finally, alternate properties can be achieved by varying the type of core material used.

While the fiber gasket and method of making the fiber gasket disclosed are particularly appropriate for high temperature applications, the flexibility they offer in terms of geometry and properties could be applied to seals for almost any application.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A fiber gasket having a multi-layer spiral winding of a fiber wound in a substantially-helical orientation characterized by a pitch back around itself in a closed path forming a loop, wherein said pitch is selected in accordance with a desired cross-sectional bulk of said loop and inversely-proportional thereto, and wherein the multi-layer spiral winding has a variable pitch around the closed path such that the loop has a variable cross-section.

2. The fiber gasket of claim 1 wherein the fiber is a ceramic fiber.

3. The fiber gasket of claim 1 wherein the multi-layer spiral winding has a core.

4. The fiber gasket of claim 3 wherein the core is made of multiple strands of the fiber.

5. The fiber gasket of claim 4 wherein the fiber is a ceramic fiber.

6. The fiber gasket of claim 3 wherein the core is a fabric.

7. The fiber gasket of claim 3 wherein the core is a resilient material.

8. The fiber gasket of claim 3 wherein the core is substantially rigid.

* * * * *